S. P. Williams.
Swinging Gate.
Nº 88,249.        Patented Mar. 23, 1869.
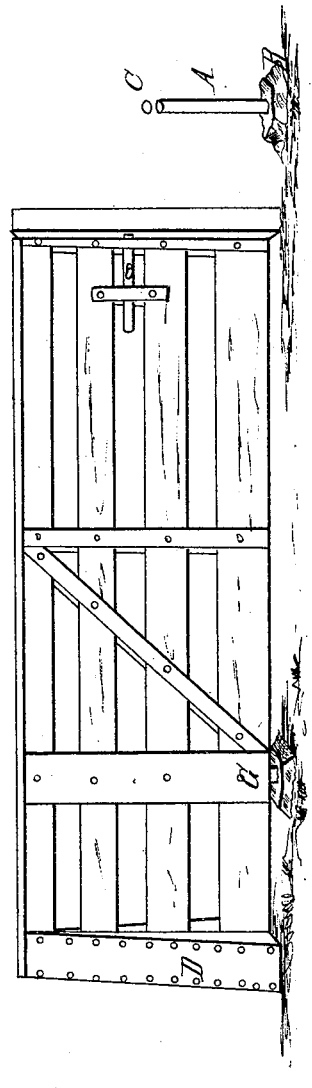
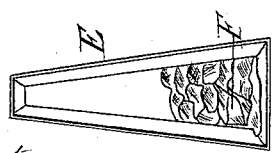
Witnesses
George Baxter
Emory Cranston
William A. Banton
Inventor.
Samuel P. Williams

SAMUEL P. WILLIAMS, OF SHERIDAN, NEW YORK.

Letters Patent No. 88,249, dated March 23, 1869.

IMPROVEMENT IN GATES.

The Schedule referred to in these Letters Patent and making part of the same.

*To all to whom it may concern:*

Be it known that I, SAMUEL P. WILLIAMS, of the town of Sheridan, in the county of Chautauqua, and State of New York, have invented a new and improved Mode of Hanging, Working, and Balancing a Swing-Gate; and I do hereby declare that the following is a full and exact description thereof, reference being had to the accompanying drawings, and to the letters of reference marked thereon.

The nature of my invention consists in hanging the gate on a pivot or post, which is made of iron, and fastened, or bedded into a stone, or other hard and durable substance, on which the gate is placed or hung, by inserting the pivot or post into a mortise, worked into the post of the gate, or a box in the gate-post; and the balancing-weight, or material is placed on a line below the fulcrum, or working-point or pivot, and in the bottom of the gate, or base of the same, so as to prevent wrenching and straining by the winds, and to cause the gate to open and close with facility and ease, and with diminished strain upon the hangings, or fastenings.

To enable others skilled in the art to make and use my invention, I will proceed to describe its construction and operation.

The post is of round iron, from one to two inches in diameter, and from eighteen to twenty inches in height, and is set or fastened into a stone bedded firmly into the ground.

Letter A, in the drawing, represents the post, or pivot;

Letter B, the stone into which the post is fastened; and

Letter C represents the iron cap inserted in the mortise, being the bearing upon which the gate plays.

The weight, or balancing-material, is placed in the lower part, or base of the box, made in a triangular shape, and is used in one of the end frame-pieces of the gate, as represented in letter D, and a face view of the same piece is represented in letter E, and the balancing-material in position, is represented by letter F.

The mortise into which the pivot or post is inserted, is in the piece of the gate G, and may be made of solid material, and the mortise dug into the lower end of the same, being so shaped as to give some play to the working of the gate, as it is raised up and down; and in the bottom of the mortise an iron plate is placed, on which the end of the pivot rests, or gate swings; or this solid frame-piece can be supplied by nailing two side, or cross-pieces on the gate, so as to form a mortise, or box for the pivot or post to play in.

What I claim as my invention, and desire to secure by Letters Patent, is—

The gate, weighted as described, and hung at a point between both ends, but remote from its centre, in combination with the short post, substantially as shown and described.

Dated at Sheridan, Chautauqua county, New York, February 4, A. D. 1869.

SAMUEL P. WILLIAMS.

Witnesses:
GEORGE BARKER,
L. L. PRATT,